United States Patent [19]

Geyer

[11] Patent Number: 5,310,565

[45] Date of Patent: May 10, 1994

[54] METHOD OF REMOVING ANTIBIOTICS FROM MILK

[75] Inventor: James E. Geyer, Baraboo, Wis.

[73] Assignee: Dairy Technology, Ltd., Baraboo, Wis.

[21] Appl. No.: 866,905

[22] Filed: Apr. 10, 1992

[51] Int. Cl.$^5$ .............................................. A23C 7/04
[52] U.S. Cl. .................................... 426/271; 426/580
[58] Field of Search .................... 426/271, 580, 330.2

[56] References Cited

U.S. PATENT DOCUMENTS

| | | | |
|---|---|---|---|
| 2,874,050 | 2/1959 | Arenson et al. | |
| 2,879,166 | 3/1959 | Wilcox | 99/54 |
| 4,138,501 | 2/1979 | Chaveron | 426/271 |
| 4,174,277 | 11/1979 | Melnick et al. | 210/36 |
| 4,238,521 | 12/1980 | Charm | 426/590 |
| 4,352,828 | 10/1982 | Riallard | 426/271 |
| 4,520,036 | 5/1985 | Riallard | 426/271 |
| 4,632,902 | 12/1986 | Waters et al. | 435/29 |
| 4,663,172 | 5/1987 | Wenner | 426/271 |
| 4,689,151 | 8/1987 | Kosekowski | 426/330.2 |
| 4,745,063 | 5/1988 | Birschback | 426/271 |
| 4,803,089 | 2/1989 | Chaveron | 426/271 |
| 4,820,348 | 4/1989 | Harju | 426/271 |
| 4,834,994 | 5/1989 | Kuwata | 426/271 |
| 5,084,285 | 1/1992 | Shematani | 426/330.2 |

OTHER PUBLICATIONS

Amberlite TM IRC-50, Product Information Bulletin published by Rohm and Haas Company, 1989.
Amberlite TM IRA-68, Product Information Bulletin published by Rohm and Haas Company, 1990.
Amberlite TM IR-120 Plus, Product Information Bulletin published by Rohm and Haas Company, May, 1980.
Amberlite TM IRA-458, Product Information Bulletin published by Rohm and Haas Company, 1990.
Amberlite TM XAD-4, Product Information Bulletin published by Rohm and Haas Company, Jan., 1983.
Duolite TM A-392, Technical Sheet published by Duolite International, Inc. May, 1980.
Memorandum from the Chief of the Food and Drug Administration Milk Safety Branch dated Nov. 16, 1990.

Primary Examiner—Carolyn Paden
Attorney, Agent, or Firm—Kenyon & Kenyon

[57] ABSTRACT

This invention relates to the treatment of milk and milk products and more particularly to a method of removing antibiotics and animal drugs from milk without substantially changing the composition of the milk comprising the steps of: a) heating milk contaminated with an antibiotic to a temperature sufficient to solubilize fats; b) contacting the milk with a resin for a period of time sufficient to allow the resin to extract antibiotics contained in the milk; and c) collecting the milk.

20 Claims, No Drawings

METHOD OF REMOVING ANTIBIOTICS FROM MILK

FIELD OF THE INVENTION

This invention relates to the treatment of milk and milk products and more particularly to a method of removing antibiotics and animal drugs from milk, without substantially changing the composition of the milk, by exposing the milk or milk product to a resin.

BACKGROUND OF THE INVENTION

Dairy cows are susceptible to many diseases such as mastitis, pneumonia, metritis, retained placenta, dystocia, foot rot, and milk fever. Some of these diseases interfere with the cow's ability to produce milk and may require that the cow be isolated and not commercially milked until cured. Untreated, some of these diseases can lead to death. Because of this potential for economic loss, dairy farmers strive to maintain their dairy cows in a healthy state. Also, healthy cows produce more and better quality milk, thus, increasing the dairy farmer's profit. As a result the dairy farmer needs to periodically medicate sick animals to bring them back to health. It is a common and necessary practice to treat lactating dairy cows for a variety of diseases by medicating them with antibiotics such as penicillin, other beta lactams, sulfas, aminoglycosides, tetracyclines, and gentamicin sulfate. Intravenous, intramuscular, and oral administration is common. These antibiotics may also be directly infused into the udder (intramammmary) in order to treat mastitis which is the most common illness in milk cows. These drugs enter the treated cow's bloodstream and also appear in the milk of the treated cow.

Regulatory agencies require that milk be free of animal drug residues because, e.g., penicillin and sulfonamides can cause allergic reactions in sensitive people ranging from skin rashes to severe respiratory problems and anaphylactic shock. About 80% to about 90% of milk contaminated with antibiotics is contaminated with penicillin. Also, exposure to veterinary antibiotics in milk can negatively affect an individual's resistance to antibiotics made for humans and render them less, or totally, ineffective. In addition, some animal drug compounds are suspected carcinogens. For these reasons, plus the fact that consumers prefer to consume "natural" milk, i.e., free of added chemicals, current regulations require that all milk be tested for the presence of animal drugs prior to use.

Animal drugs are normally kept out of the milk sold to processors by isolating the treated cow and disposing of the milk from treated cows for the period of time specified by the drug manufacturer. In spite of these precautions, milk containing antibiotic residues is sometimes unknowingly acquired by milk processors. Some of the major reasons why contaminated milk finds it way to processors are: some cows retain drugs longer than the average isolation period recommended by drug manufacturers, treated cows are not marked or identified, sellers of recently treated cows do not advise the purchaser of the treatment, lack of communication between the individual responsible for treating the cow and the individual responsible for milking, treating the wrong cow, lack of training of treating and milking personnel, and administering multiple drugs in a single treatment. Most milk is purchased and delivered to the processor in bulk loads. Most bulk loads of milk contain multiple sources of milk. Should a dairy farmer accidentally or intentionally misuse a drug while treating a cow, the milk from even one improperly treated cow will contaminate his entire bulk shipment—which in turn will contaminate the entire bulk load to which it is added.

Currently milk containing antibiotics and other animal drug residues cannot be fed to humans or animals. At the present time, milk found to contain animal drugs cannot be reconditioned, blended or used for human consumption. The United States Food and Drug Administraion has stated that it is not aware of any currently acceptable process that can be used to eliminate drug residues in milk and recondition the milk for human consumption. (See Memorandum from the Chief of the Food and Drug Administration Milk Safety Branch dated Nov. 16, 1990 (FDA Policy regarding the disposition of raw milk that contains drug residue). The contaminated milk is generally disposed of by land spreading at zero value. When the processor must dispose of a bulk shipment containing some contaminated milk (because one of the multiple sources has contaminated the entire bulk shipment), the processor must still pay the dairy farmers supplying uncontaminated milk the full value for their milk. This causes the processor significant economic loss. In addition, at certain times of the year government environmental agencies will not permit land disposal of milk contaminated with antibiotics, thus, giving the processor limited, and expensive, disposal options such as storage, treatment at a municipal waste treatment plant, or incineration.

A means to remove the antibiotics is sought to recover the milk for some acceptable use and recover some or all of its economic value. Removal of these drugs will permit utilization of this milk by humans and animals. The need exists, therefore, for a method of removing antibiotics from milk.

OBJECTS AND SUMMARY OF THE INVENTION

It is an object of the present invention to provide a means for removing antibiotics and other animal drugs from milk and other dairy products without significantly altering the composition of the milk.

The present invention provides a method for removing antibiotics from milk, comprising the steps of: a) heating milk contaminated with an antibiotic to a temperature sufficient to solubilize fats; b) contacting the milk with a resin for a period of time sufficient to allow the resin to extract antibiotics contained in the milk; and c) collecting the milk.

The invention is more particularly illustrated by the following examples. Two tests were conducted to determine if resins could remove low levels of antibiotics from milk. The following examples are offered for the purpose of illustration and are not intended to either define or limit the invention in any manner.

DESCRIPTION OF THE PREFERRED EMBODIMENTS

Example 1

Six separate ion exchange columns, having an internal diameter of 1" and a length of 48", were filled with 400 ml volumes of six different resins. The resins were: Amberlite TM IR-120 (calcium form) strong acid cation exchanger; Amberlite TM IRA-68 (free base form) weak base anion exchanger; Amberlite TM IRC-50 (calcium form) weak acid cation exchanger; Amberlite TM IRC-50 (hydrogen form): weak acid cation exchanger; Amberlite TM XAD-4 resin adsorbent (no functional group); and Amberlite TM IRA-458 (chloride form) strong base anion exchanger all available from Rohm and Haas Co., Philadelphia, Pa.

Each resin was pre-conditioned as recommended by the manufacturer and then regenerated to the ionic form and placed in columns as follows:

| Column | Resin Installed |
|---|---|
| A | Amberlite TM IR-120 (calcium form) strong acid cation exchanger. |
| B | Amberlite TM IRA-68 (free base form) weak base anion exchanger. |
| C | Amberlite TM IRC-50 (calcium form) weak acid cation exchanger. |
| D | Amberlite TM XAD-4 resin adsorbent (no functional groups). |
| E | Amberlite TM IRA-458 (chloride form) strong base anion exchanger. |

[1]No effluent samples from operation of the Amberlite TM IRC-50 in the hydrogen (H$^+$) form were obtained because the exchange of cations acidified the milk to the extent that it curdled and plugged the column.

Before service all resins were rinsed to $\leq 20$ μmhos conductivity. Subsequently, water in the columns was drained down to about 0.5 cm above each resin before processing of whole milk containing added antibiotics.

Whole milk containing added antibiotics was pumped separately through each noted resin column at about 4 bed volumes (b.v.) per hour or 27 ml/min. The milk was heated to about 110° F. prior to pumping through the resin columns to solubilize fats. The first effluent (0.4 b.v. or 160 ml was
, No effluent samples from operation of the Amberlite TM IRC-50 in the hydrogen (H$^+$) form were obtained because the exchange of cations acidified the milk to the extent that it curdled and plugged the column. discarded and subsequently three fractions of 4 b.v. or 1600 ml each were collected. Samples of each fraction were taken for analysis.

The milk supplied had been "spiked" with four antibiotics: penicillin, tetracycline, sulfamethazine and aminoglycoside, as noted in Table 3. *Bacillus stearothermophilus* disk assay and Charm II TM (available from Charm Sciences Inc., 36 Franklin Street, Malden, Mass. 02148) tests were conducted to determine the presence of antibiotics in the effluent.

Analysis of the fractions taken is shown in Tables 1, 2 and 3. Table 1 shows the effluent mineral profile for each resin.

TABLE 1

| MINERAL PROFILE MG/100 Gram | | | | | | |
|---|---|---|---|---|---|---|
| | Control | Sample A IR-120 | Sample B IRA-68 | Sample C IRC-50 | Sample D XAD-4 | Sample E IRA-458 |
| Na | 390 | 330 | 380 | 400 | 380 | 430 |
| K | 1550 | 970 | 1500 | 1460 | 1490 | 1580 |
| Ca | 1080 | 1430 | 980 | 950 | 1110 | 1030 |
| Mg | 110 | 60 | 90 | 90 | 100 | 80 |
| P | 710 | 690 | 580 | 740 | 650 | 560 |

Control - milk spiked with antibiotics
A - IR-120 (Ca$^{++}$) Effluent
B - IRA-68 (OH$^-$) Effluent
C - IRC-50 (OH$^{++}$) Effluent
D - XAD-4 Effluent
F - IRA-458 (Cl$^-$) Effluent

TABLE 2

| COMPOSITION DATA (MG/100 Gram) | | | | | | |
|---|---|---|---|---|---|---|
| | Control | Sample A IR-120 | Sample B IRA-68 | Sample C IRC-50 | Sample D XAD-4 | Sample E IRA-458 |
| Butterfat | 3.74 | 3.73 | 3.76 | 3.66 | 3.74 | 3.72 |
| Protein | 3.16 | 3.11 | 3.25 | 3.12 | 3.14 | 2.90 |
| Lactose | 5.07 | 4.99 | 5.13 | 4.96 | 5.10 | 4.95 |
| Ash | 0.699 | 0.653 | 0.632 | 0.659 | 0.697 | 0.676 |
| SNF | 8.85 | 8.72 | 9.03 | 8.70 | 8.89 | 8.45 |
| Titratable Acidity | 0.14 | 0.20 | 0.0 | 0.25 | 0.17 | 0.165 |
| pH | 6.69 | 6.32 | 8.87 | 6.21 | 6.55 | 6.45 |
| Solids Non Fat | | | | | | |

Control - Antibiotic Spiked Whole Milk
A - IR-120 (Ca$^{++}$) Effluent
B - IRA-68 (OH$^+$) Effluent
C - IRC-50 (Ca$^{++}$) Effluent
D - XAD-4 Effluent
E - IRA-458 (Cl$^-$) Effluent Table 3 shows relative responses for antibiotics present for each resin. A reading higher than the control point indicates removal of antibiotics.

TABLE 3

| | REMOVAL OF ANTIBIOTICS FROM MILK BY RESINS | | | | | | | | |
|---|---|---|---|---|---|---|---|---|---|
| | CONTROL POINTS | | SPIKED MILK$^B$ | | | | | | |
| DRUG | CHARM II CPM* | Animal Drug CONCEN-TRATION | CHARM II CPM | Animal Drug CONCEN-TRATION | SAMPLE A CHARM II CPM | SAMPLE B CHARM II CPM | SAMPLE C CHARM II CPM | SAMPLE D CHARM II CPM | SAMPLE E CHARM II CPM |
| Penicillin | 639 | 4.8 ppb | 519 | 7.6 ppb | 585 | 1147 | 782 | 1222 | 668 |
| Tetracycline | 1051 | 100 ppb | 1389 | 79 ppb | 630 | 595 | 1176 | 1107 | 1114 |
| Sulfamethazine | 1222 | 10.0 ppb | 1253 | 12 ppb | 1060 | 1126 | 1383 | 720 | 1078 |
| Aminoglycoside | 744 | 30.0 ppb | 558 | 42 ppb | 787 | 514 | 1281 | 664 | 688 |

*CPM = Counts per minute, Charm II
If sample count per minute (CPM) is 20% or greater than control point (CPM) sample result is negative.
$^b$Control - antibiotic spiked whole milk
A - IR - 120 (Ca$^{++}$) Effluent
B - IRA - 68 (OH$^+$) Effluent
C - IRA - 50 (Ca$^{++}$) Effluent
D - XAD - 4 Effluent
E - IRA - 458 (Cl) Effluent Sample A tests showed that Amberlite TM IRA-120 ((Ca$^+$) calcium form) did not remove any of the four antibiotics added to the milk. This cation exchange resin increased the calcium content of the milk by exchange for potassium and magnesium. Otherwise no significant compositional changes occurred.

Sample B tests showed that Amberlite TM IRA-68 (free base (OH') form) removed penicillin but had no affect on removal of other antibiotics present. Amberlite TM IRA-68 also adsorbed acids (assumed to be mostly lactic) from the milk and thus increased the treated milk pH. Apparently some phosphate was removed also as analysis for phosphorus indicated a reduced level. These were the only apparent negative effects of treatment with this resin. No significant change of mineral profile was obvious except for some lost phosphorus and total ash. The resin did adsorb some acids and raise the pH as a consequence (see Table 2).

Sample C tests showed that Amberlite TM IRC-50 ((Ca++) calcium form) removed penicillin and aminoglycoside and also appears to remove some sulfamethazine. The mineral profile was not changed significantly by this resin form. Neither were other compositional aspects as indicated in Table 2.

Sample D tests showed that Amberlite TM XAD-4 appears to remove penicillin but has no affect on the other antibiotics present. XAD-4 did not change the mineral profile. No significant change was anticipated since the resin has no functional groups. Other composition aspects as noted in Table 2 were unaffected. The XAD-4 resin did, however, remove a yellow colored substance, assumed to be riboflavin, from the milk as indicated by visual observations of the resin.

Sample E tests showed that Amberlite TM IRA-458 (chloride (Cl−form) did not remove any significant amount of antibiotic. This strong base resin apparently reduced the phosphorus content also.-probably by exchange of some phosphate for chloride; (see Table 1). Also a very small amount of protein may have been adsorbed (see Table 2). Otherwise compositional changes were insignificant.

Example 2

Four separate ion exchange columns, having an internal diameter of about 1" and a length of about 48", were filled with 400 ml of four different resins. The resins were: Amberlite TM IRA-68 (free base form) weak base anion exchanger; Amberlite TM IRA-68 (chloride form) strong base anion exchanger; Duolite TM A-392; and Amberlite TM XAD-4 resin adsorbent (no functional groups). Amberlite TM IRA-68 (both forms) and Amberlite TM XAD-4 are available from Rohm and Haas Co., Philadelphia, Pa. Duolite TM A-392 is also available from Rohm7,18,19,20,21,22 and Haas Co. The test was conducted following the same procedures used in Example 1. Each resin was placed in columns as follows:

| Column | Resin Installed |
| --- | --- |
| A | Amberlite TM IRA-68 (free base (OH+) |

| Column | Resin Installed |
| --- | --- |
|  | form) weak base anion exchanger. |
| B | Amberlite TM IRA-68 (chloride (Cl−) form) strong base anion exchanger. |
| C | Duolite TM A-39.2 |
| D | Amberlite TM XAD-4 resin adsorbent (no functional groups). |

Table 4 shows the effluent mineral profile for each resin.

TABLE 4

| MINERAL PROFILE (MG/100 Gram) | | | | | |
| --- | --- | --- | --- | --- | --- |
|  | Control | Sample A IRA-68 | Sample B IRA-68 | Sample C A392 | Sample D XAD-4 |
| NA | 43 | 42 | 42 | 43 | 43 |
| K | 156 | 154 | 154 | 154 | 153 |
| Ca | 109 | 101 | 104 | 95 | 109 |
| Mg | 10.5 | 9.7 | 8.6 | 7.8 | 10.6 |
| P | 83 | 74 | 40 | 78 | 86 |
| Cl | 120 | 85 | 320 | 91 | 110 |

Control = Antibiotic Spiked Whole Milk
A - IRA-68 (OH−) Effluent
B - IRA-68 (Cl−) Effluent
C - A-392 (OH+) Effluent
D - XAD-4 Effluent Table 5 shows other composition data for each resin.

TABLE 5

| COMPOSITION DATA (g/100 gram) | | | | | |
| --- | --- | --- | --- | --- | --- |
|  | Control | Sample A IRA-68 | Sample B IRA-68 | Sample C A392 | Sample D XAD-4 |
| BUTTER FAT | 3.53 | 3.46 | 3.51 | 3.48 | 3.47 |
| PROTEIN | 3.07 | 3.12 | 2.70 | 3.09 | 3.07 |
| LACTOSE | 4.90 | 4.98 | 4.64 | 5.12 | 4.98 |
| SNF[a] | 8.50 | 8.67 | 7.86 | 8.76 | 8.61 |
| TOTAL SOLIDS | 12.06 | 11.82 | 11.99 | 11.92 | 12.01 |
| ASH | 0.690 | 0.655 | 0.637 | 0.624 | 0.705 |
| pH | 6.69 | 9.55 | 6.04 | 8.46 | 6.70 |
| TITRATABLE ACIDITY | 0.16 | 0 | 0.12 | 0.01 | 0.17 |

[a]solids not fat
A - IRA-68 (OH+) Effluent
B - IRA-68 (Cl−) Effluent
C - A-392 (OH−) Effluent
D - XAD-4 Effluent Table 6 shows relative responses for antibiotics present. A reading higher than the control indicates removal of antibiotics.

TABLE 6

| REMOVAL OF ANTIBIOTICS FROM MILK BY RESINS | | | | | | | | |
| --- | --- | --- | --- | --- | --- | --- | --- | --- |
|  | CONTROL POINTS | | SPIKED MILK[B] | | | | | |
| DRUG | CHARM II CPM* | Animal Drug CONCEN- TRATION | CHARM II CPM | Animal Drug CONCEN- TRATION | SAMPLE A IRA 68 | SAMPLE B IRA 68 | SAMPLE C A 392 | SAMPLE D XAD 4 |
| Penicillin | 265 | 4.8 ppb | 243 | 8.6 ppb | 1221 | 538 | 728 | 950 |
| Tetracycline | 693 | 100 ppb | 697 | 120 ppb | 596 | 948 | 1370 | 1072 |
| Sulfamethazine | 856 | 10 ppb | 595 | 12.6 ppb | 332 | 557 | 1100 | 1089 |
| Aminoglycoside | 434 | 30 ppb | 337 | 42 ppb | 190 | 577 | 390 | 726 |

TABLE 6-continued

REMOVAL OF ANTIBIOTICS FROM MILK BY RESINS

| | CONTROL POINTS | | SPIKED MILK[B] | | | | | |
|---|---|---|---|---|---|---|---|---|
| DRUG | CHARM II CPM* | Animal Drug CONCEN- TRATION | CHARM II CPM | Animal Drug CONCEN- TRATION | SAMPLE A IRA 68 | SAMPLE B IRA 68 | SAMPLE C A 392 | SAMPLE D XAD 4 |
| Disc Assay [a] mm | — | | 18 mm | | N.F | N.F | N.F | N.F |

*CPM = Counts per minute, Charm II
[a] Bacillus stearothermophilus disc assay
*If sample count per minute (CPM) IS 20% or greater than control point (CPM) sample result is negative.
[b] Control - antibiotic spiked whole milk
A - IRA - 68 (OH⁺) Effluent
B - IRA - 68 (Cl) Effluent
C - A 392 - (OH⁺) Effluent
D - XAD - 4 Effulent Sample A tests showed that Amberlite ™ IRA-68 (free base (OH+) form) removed penicillin but had no effect on the other antibiotics present.

Sample B tests showed that Amberlite ™ IRA-68 (chloride (Cl−form) removed penicillin, tetracycline, and aminoglycoside.

Sample C tests showed that Duolite ™ A-392 removed penicillin, tetracycline and sulfadimethazine.

Sample D tests showed that Amberlite ™ XAD-4 removed penicillin, tetracycline, sulfamethazine and aminoglycoside. Sample D Amberlite ™ XAD-4 results were the most consistent with milk with respect to mineral composition and compositional data except that this column removed riboflavin. Tests showed that the level of riboflavin was 0.02 mg/100 gram instead of a typical value of about 0.17 mg/100 gram.

HPLC test results, shown in Table 7, confirms the removal of penicillin and tetracycline. Table 7 also confirms the removal of sulfamethazine by D but not C.

TABLE 7

REMOVAL OF ANTIBIOTICS FROM MILK BY RESINS
HIGH PRESSURE LIQUID CHROMOTOGRAPHY (HPLC)

| | Minimum Detection Limit | Sample C A - 392 | Sample D XAD-4 | Level Added |
|---|---|---|---|---|
| Pencillin - G | 10 ppb | Not Detected | Not Detected | 8.6 ppb |
| Tetracycline | 100 ppb | Not Detected | Not Detected | 120 ppb |
| Sulfamethazine | 5 ppb | 10 ppb | Not Detected | 12.6 ppb |
| Gentamycin | No Result - interference present | | | 42 ppb |

C - A - 392 (OH⁺) Effluent
D - XAD - 4 Effluent

Other commercially available resins are available and are expected to perform similarly as the examples cited. The resins used in the examples are FDA approved for food processing.

It is to be understood that the invention is not limited to the illustrations described and shown herein, which are deemed to be merely illustrative. The invention also encompasses all such modifications which are within the range of the following claims.

I clam:

1. A method for removing antibiotics from milk, comprising the steps of:
   a) heating milk contaminated with an antibiotic to a temperature sufficient to solubilize fats;
   b) contacting the milk with a resin for a period of time sufficient to allow the resin to extract antibiotics contained in the milk without substantially changing the composition of the milk; and
   c) collecting the milk.

2. The method of claim 1 wherein the milk is heated to a temperature of about 110° F.

3. The method of claim 1 wherein said resin is a non-ionic hydrophobic resin.

4. The method of claim 1 wherein said resin is a anion exchange resin.

5. The method of claim 1 wherein said resin is a cation exchange resin.

6. A method of removing penicillin from milk comprising the steps of:
   a) heating milk contaminated with penicillin to a temperature sufficient to solubilize fats;
   b) contacting the milk with a resin for a period of time sufficient to allow the resin to extract the penicillin contained in the milk without substantially changing the composition of the milk; and
   c) collecting the milk.

7. The method of claim 6 wherein said resin is a anion exchange resin.

8. The method of claim 6 wherein said resin is a cation exchange resin.

9. The method of claim 6 wherein said resin is a non-ionic hydrophobic resin.

10. A method for removing aminoglycoside from milk comprising the steps of:
    a) heating milk contaminated with aminoglycoside to a temperature sufficient to solubilize fats;
    b) contacting the milk with a resin for a period of time sufficient to allow the resin to extract the aminoglycoside contained in the milk without substantially changing the composition of the milk; and
    c) collecting the milk.

11. The method of claim 10 wherein said resin is a non-ionic hydrophobic resin.

12. The method of claim 10 wherein said resin is a anion exchange resin.

13. The method of claim 10 wherein said resin is a cation exchange resin.

14. A method of removing tetracycline from milk comprising the steps of:
    a) heating milk contaminated with tetracycline to a temperature sufficient to solubilize fats;
    b) contacting the milk with a resin for a period of time sufficient to allow the resin to extract tetracycline contained int he milk without substantially changing the composition of the milk; and
    c) collecting the milk.

15. The method of claim 14 wherein said resin is a non-ionic hydrophobic resin.

16. The method of claim 14 wherein said resin is a anion exchange resin.

17. A method of removing sulfamethazine from milk, comprising the steps of:
 a) heating milk contaminated with sulfamethazine to a temperature sufficient to solubilize fats;
 b) contacting the milk with a resin for a period of time sufficient to allow the resin to extract the sulfamethazine contained in the milk without substantially changing the composition of the milk; and
 c) collecting the milk.

18. The method of claim 17 wherein said resin is a non-ionic hydrophobic resin.

19. The method of claim 17 wherein said resin is a anion exchange resin.

20. The method of claim 17 wherein said resin is a cation exchange resin.

* * * * *